United States Patent Office 2,850,508
Patented Sept. 2, 1958

2,850,508

HYDROGENATION OF KOJIC ACID TO HEXAHYDROKOJIC ACID

Jay S. Buckley, Jr., Groton, Russell D. Drinkard, New London, and Paul D. Thomas, Groton, Conn., assignors to Chas. Pfizer & Co., Inc., Brooklyn, N. Y., a corporation of Delaware No Drawing. Application August 5, 1955
Serial No. 526,768

4 Claims. (Cl. 260—345.9)

This invention is concerned with a new and useful process for the preparation of hexahydrokojic acid. Hexahydrokojic acid is useful as a humectant, a plasticizer, and as an intermediate in the preparation of polyester resins and emulsifiers useful in the food industry.

Certain polyester-type resins derived from hexahydrokojic acid are the subject of a copending application Serial No. 526,785, filed August 5, 1956. A group of ether and ester type food emulsifiers derived from hexahydrokojic acid are the subject of another copending application Serial No. 526,767, filed August 5, 1955.

Hexahydrokojic acid is most readily obtained by the catalytic hydrogenation of kojic acid or its salts. This process is illustrated by the following equation.

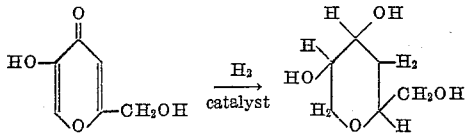

Kojic acid is a fermentation product obtained by the cultivation of certain species of Aspergillus under appropriate conditions. Kojic acid is acidic by virtue of its enolic hydroxyl group while the hydrogenation product, hexahydrokojic acid, is a neutral, cyclic polyalkanol.

Various processes have been suggested in the past for the preparation of hexahydrokojic acid from kojic acid. However, none has been satisfactory. Previous processes involve low pressure catalytic hydrogenation in the presence of a noble metal catalyst such as platinum or palladium. These processes are unsatisfactory from several points of view both with regard to their laboratory use and their commercial application. First, it has not been possible to produce pure hexahydrokojic acid by these processes. Mixtures containing partially hydrogenated kojic acid along with the hexahydro derivative were obtained. Separation of these mixtures was very difficult and costly, and as a result, pure hexahydrokojic acid was unknown prior to the development of the valuable process of this invention.

The crude mixtures of the prior art methods are not satisfactory intermediates for chemical syntheses such as the preparation of esters, ethers, and resins as described in the copending applications referred to above. In general, it is desirable to have a pure or at least a reproducible product as a starting material for such processes. A further shortcoming of prior art processes for the preparation of hexahydrokojic acid is that noble metal catalysts are required. Such catalysts are expensive and recovery of the metal from the spent catalyst is necessary. It is therefore an object of this invention to provide a process for the preparation of hexahydrokojic acid which is convenient and economical to operate and which gives a pure and reproducible product.

It has now been found that kojic acid is smoothly and rapidly hydrogenated to hexahydrokojic acid in the presence of a nickel catalyst at elevated temperatures and superatmospheric pressures. Pressures in the range 500–2000 p. s. i. are readily obtained with ordinary high pressure equipment and yield satisfactory results in the instant process. Analytically pure hexahydrokojic acid is consistently produced by this process. Various types of nickel catalysts can be employed including supported nickel catalysts such as nickel on kieselguhr and the so-called Raney nickel catalysts which are a very finely divided form of nickel prepared by the treatment of an aluminum-nickel alloy with strong alkali to dissolve away the aluminum. The preparation of such catalysts is well known in the art. Although it is customary to recover the metal from spent nickel catalysts as is done with noble metal catalysts, recovery is not usually a critical economic factor.

The hydrogenation can be carried out either in an aqueous suspension or solution or in an organic solvent. Suitable solvents include the lower alkanols such as methanol, ethanol, and isopropanol; tertiary amines such as those of the aliphatic, hydrolylated aliphatic, aromatic and the liquid heterocyclic series including triethylamine, dimethylethanolamine, triethanol amine, dimethylaniline, and pyridine, and certain other materials such as dimethylformamide. The choice of solvent is not a critical factor in the process as long as all of the components are compatible and the solvent itself is not affected by the hydrogenation conditions. It is not necessary that the kojic acid dissolve completely in the solvent employed. Slurries or suspensions of kojic acid may be employed as long as the kojic acid is partially soluble. However, it is preferred to use water as the solvent since the fire hazard involved with the use of finely divided metal catalysts with inflammable solvents eliminated. The process is usually carried out in a batch-wise fashion wherein the solvent and the kojic acid is charged to an autoclave equipped for heating and agitation, either by stirring or rocking, the catalyst is added, and the mixture hydrogenated until three moles of hydrogen is absorbed per mole of kojic acid charged. Hydrogen absorption ceases at this point which corresponds to the theoretical amount. Recovery of the product involves filtration of the catalyst and washing of it with fresh solvent, evaporation of the solvent, and, in some cases, distillation of the crude product. When the product is not distilled, it is customary to dry it thoroughly in a high vacuum prior to use or storage.

A preferred embodiment of this valuable invention yields hexahydrokojic acid of analytical quality directly and avoids the distillation step which is difficult and costly to carry out on a commercial scale. The essential features of this embodiment involve carrying out the hydrogenation at as low a temperature as possible, prompt separation of the catalyst, and treatment of the supernatant liquid with decolorizing carbon. The use of as low a temperature as possible is important since carbonization is a problem at higher temperatures. It has been found that it is most satisfactory to operate in the range 80–110° C. However, with very active catalysts temperatures as low as room temperature or about 30° C. may be employed. Above 110° C. carbonization is quite severe and purification of the product is a problem. A further factor in obtaining a pure product is to minimize the contact time of the hydrogenation solution with the catalyst since the catalyst also seems to cause discoloration of the solution.

As was indicated above, it is also possible to prepare hexahydrokojic acid by the hydrogenation of salts of kojic acid. Either the metal or the amine salts may be employed. Examples of the metal salts include the sodium, potassium, lithium, calcium and barium salts. Amine salts with such strongly basic amines as triethylamine, trimethylamine, and triethanolamine as well as the ammonium salt may be used. Use of salts of kojic acid in the instant process is however attended by certain difficulties. Kojic acid is somewhat unstable a high pHs and a greater amount of decomposition with the attendant purification problem is encountered. Furthermore, since the product, hexahydrokojic acid, is a neutral compound, the base corresponding to the original salt charged is liberated during the hydrogenation. A step must therefore be included in the recovery process to allow for separation of the liberated base. The primary advantage of using a salt of kojic acid or an alkaline material with the kojic acid in some cases is to improve the solubility of the kojic acid in the solvent selected.

In one specific embodiment of this valuable invention, kojic acid that had been previously purified by recrystallization from water was dissolved in about three times its weight of water and hydrogenated at 90° and 1500 p. s. i. pressure for five hours over Raney nickel. The hexahydrokojic acid so produced was obtained in a condition of analytical purity by treating the filtered hydrogenation solution with decolorizing carbon, filtering the carbon, stripping the solvent, and drying the product.

Hexahydrokojic acid is a colorless, viscous oil, which can be distilled in a high vacuum. Its boiling point is 160–164° C./0.3 mm., and its refractive index $$n_D^{25} = 1.504$$

This cyclic polyalcohol appears to be somewhat unstable above about 150° C., but appears to be quite stable at room temperature.

The following examples are given to further illustrate the invention. However, they are not to be considered as limiting said invention in any way.

Example I

A solution of 28.5 g. (0.2 mole) of kojic acid, M. P. 153.5–154.5° C., in 500 ml. of anhydrous ethanol was hydrogenated at 1500 p. s. i. and 110° C. for 4 hours using about 10 g. of Raney nickel as the catalyst. The hydrogen uptake during this time corresponded to 0.6 mole of hydrogen or three moles per mole of kojic acid. The vessel was cooled, the contents filtered and the solvent evaporated from the ethanolic filtrate. There remained a dense viscous oil which was distilled in vacuo; B. P 160–164° C./0.3 mm. The yield of distilled product was 20.2 g. (68.3%). The hydroxyl value was determined by the acetic anhydride-pyridine method (Siggia, "Quantitative Organic Analysis via Functional Groups," John Wiley & Sons, Inc., 1949, p. 4) and found to be 48.7. Assuming three hydroxyl groups per mole of hexahydrokojic acid, the calculated value is 49.2.

*Analysis.*—Calcd. for $C_6H_{12}O_4$: C, 48.64; H, 8.16. Found: C, 48.61; H, 8.05.

Example II

A solution of 125 g. of kojic acid, which had been recrystallized from water, in 400 ml. of water was hydrogenated at 1500 p. s. i. and 80–100° C. for 5 hours over Raney nickel. The vessel was cooled to room temperature and the contents promptly filtered. The filtrate was treated with decolorizing carbon and the carbon filtered with the aid of a diatomaceous earth filter aid. The clear aqueous filtrate was concentrated in vacuo. The residue remaining contained 0.6% $H_2O$. A method employing the Karl Fischer reagent (Mitchell and Smith, "Aquametry," Interscience Publishers, Inc., New York, 1940, p. 126) was used for the water assay. The product was a very viscous straw-yellow liquid weighing 123 g. (94%).

*Analysis.*—Calcd. for $C_6H_{12}O_4$: C, 48.64; H, 8.16; hydroxyl value, 49.2. Found: C, 48.32; H, 8.35; hydroxyl value, 50.5.

What is claimed is:

1. A process for preparing hexahydrokojic acid comprising hydrogenating kojic acid in a reaction inert solvent at a temperature substantially in the range 30° C. to 110° C. at superatmospheric pressure in the presence of Raney nickel catalyst.

2. A process as claimed in claim 1 wherein the hexahydrokojic acid is recovered from the reaction mixture.

3. A process as claimed in claim 1 wherein the pressure is substantially in the range 500 to 2000 pounds per square inch.

4. A process for preparing hexahydrokojic acid comprising the steps of hydrogenating kojic acid in a reaction inert solvent at a temperature substantially in the range of 30° C. to 110° C. at superatmospheric pressure and in the presence of a suspension of Raney nickel catalyst, separating the catalyst from the resulting reaction product, treating the reaction product with a decolorizing agent, subsequently separating the decolorizing agent, and then recovering hexahydrokojic acid in substantially pure form.

References Cited in the file of this patent

Maurer: Berichte, 64, pp. 2358–60 (1931).